T. J. Magruder.
Harness-Trimming.
Nº 74,391. Patented Feb. 11, 1868.
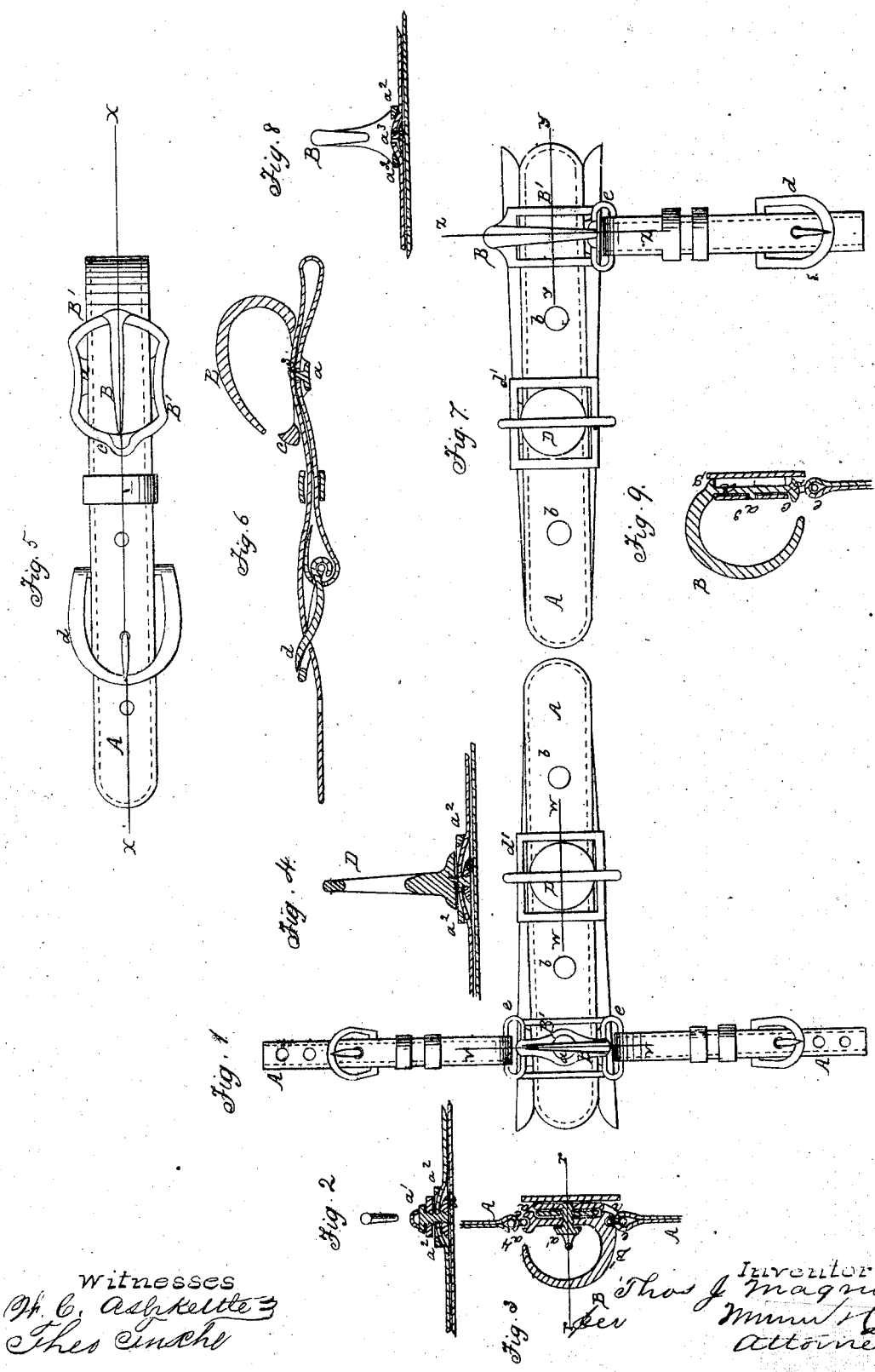

United States Patent Office.

THOMAS J. MAGRUDER, OF MARION, OHIO.

Letters Patent No. 74,391, dated February 11, 1868.

---

IMPROVEMENT IN HARNESS-TRIMMINGS.

---

The Schedule referred to in these Letters Patent and making part of the same.

---

TO ALL WHOM IT MAY CONCERN:

Be it known that I, THOMAS J. MAGRUDER, of Marion, in the county of Marion, and State of Ohio, have invented new and improved Harness-Trimmings; and I do hereby declare that the following is a full, clear, and exact description thereof, which will enable others skilled in the art to make and use the same, reference being had to the accompanying drawings, forming part of this specification.

This invention relates to a new and improved method of constructing centre-bar rein-hooks and terrets for various styles of harness, whereby the same are more cheaply made, and whereby they hold the rein more securely, and the same being movable, they may be used near the top of the harness, whereby, also, they make no swell underneath the pad, and the same are less liable to injure the horse by chafing.

It consists of a metallic rein-hook attached to one end of a metallic frame, the other end of the frame being provided with a projection or shoulder, the said hook being bent forward so as nearly to touch said shoulder; said frame being provided also with a cross-bar provided with a pin upon the upper side, by means of which said hook is secured to the harness.

It consists also of a rein-hook constructed similarly to the above, but secured to a frame provided upon one or both ends of said frame with an eye to receive parts of the harness, said hook being secured to the said frame by a screw; said frame being made similarly to the frame just above described, the hook in that case being rigidly secured to said frame.

It consists also of a terret in the common form, provided with a screw-thread on the lower end, by means of which it is secured to the cross-bar of a frame constructed as above, the part of the harness passing over the said cross-bar and under the sides of the frame, the screw-thread of the terret passing through a hole in the harness for that purpose, whereby the said terret is firmly secured to the harness, so that the same will not slip thereon. In the accompanying plate of drawings—

Figure 1 is a plan view of parts of a harness with my improvements attached.

Figure 2 is a cross-section of the rein-hook, taken in the line $r\ r$, fig. 3, the harness being shown in red.

Figure 3 is a central longitudinal sectional view of the same, taken in the line $v\ v$, fig. 1, the harness being shown in red.

Figure 4 is a central longitudinal sectional view of a terret and frame, taken in the line $w\ w$, fig. 1, the harness being shown in red.

Figure 5 is a plan view of portion of the harness, with a rein-hook attached.

Figure 6 represents a central longitudinal section of the same, taken in the line $x\ x$, fig. 5, the harness being shown in red.

Figure 7 is a plan view of a portion of a harness, with a terret and fixed rein-hook attached.

Figure 8 is a central cross-sectional view of the rein-hook, taken in the line $y\ y$, fig. 7, the harness being shown in red.

Figure 9 is a central longitudinal sectional view of the same, taken in the line $z\ z$, fig. 7, the harness being shown in red.

Similar letters of reference indicate corresponding parts.

A are parts of the harness; B is the rein-hook; D are terrets; $d'$ are terret-frames; B' are rein-hook frames; $a$ is a cross-bar on the under side of a rein-hook frame; $a^1$ is a screw, to secure a movable rein-hook, B to the frame B'; $e$ are eyes on a rein-hook frame, to receive the harness; $a^2$ are the sides of the frame B', or of the terret-frame $d'$; $a^4$ are projections on rein-hook frame, to prevent the rein from slipping out; $a^5$ are screws to secure a rein-hook and frame to the harness A; $d'$ is a terret-frame; $a^3$ is a pin to secure a rein-hook to harness A, to prevent the same from slipping on said harness A; $b$ are rivets, securing two or more parts of a harness together; S are flanges on the rein-hook B, fig. 9.

The more clearly to describe my invention, it may be divided into two parts: first, the rein-hook, and, second, the terrets.

The rein-hooks are shown in section in the drawings, fig. 3, fig. 6, and fig. 9, and are in the forms as there represented. The first form is shown in the drawing, fig. 3. The hook B, fig. 3, is in the general form of rein-hooks now in use, but is separate and distinct from the burr-frame B', fig. 1, being secured to the centre-bar $a$ of the same by a screw, $a^1$, so as that said hook B may be easily removed. Said hook B consists of a plate or support, by means of which the said hook is secured to the bar $a$, a hole being drilled in said plate to receive the screw $a^1$, the hook itself and said plate being cast of one piece, the hook being bent up from one end of said plate or support in the form of rein-hooks now in use, and so as to reach quite to the other end of said plate, so as to receive a check-rein in the ordinary way, said plate being provided on the other end with a projection, $a^4$, to prevent the rein from slipping out, said projection $a^4$ extending upwards so as nearly to reach the end of the hook B. Said plate is provided on the same end as the projection $a^4$ with a notch, which, engaging with the back of one of the loops $e$, prevents the hook B from moving sidewise, the other end of said plate fitting into a notch in the other of said loops or eyes $e$ for the same purpose. The centre burr-plate or frame B' is formed of two parallel bars, of any convenient length, at any convenient distance apart, according to the size of the harness on which the same is to be used, joined together at the ends by the loops or eyes $e$, as shown in the drawing, fig. 1, and having attached to said eyes $e$, a centre-bar $a$, said bar $a$ being a little below said parallel bars, and running parallel therewith and between the same. Said centre-bar $a$ has a hole drilled through the centre of the same, said hole being provided with a screw-thread to receive the screw $a^5$. Said parallel bars are also provided with shoulders or projections on the under side of the same, which, bearing against the strap or part of the harness, A, to which the same is secured, serve to prevent the frame or frames B' from slipping on the harness. The part of the harness on which the rein-hook is to be attached is placed under one of the above parallel bars, and over the centre-bar $a$, and under the other of said parallel bars, and between the shoulders above described, when the centre-bar frame or plate is moved to any desired place on the harness. A hole is then made in the harness corresponding with the hole in the centre-bar $a$; the hook B is then placed in position over the same, and secured thereto by the screw $a^1$, said screw $a^1$ having a hole in the head of the same, or its equivalent, by means of which the screw $a^1$ is more easily turned, and the hook B more firmly secured to the centre-bar burr-plate B'.

The second form of rein-hooks is shown in the drawing at fig. 6, the hook B and frame B' and centre-bar $a$ being of one piece, said frame B' being provided with a projection, $c$, upon one end of the same, to prevent the rein from slipping out of the hook. The centre-bar $a$, fig. 6, is provided on the upper side of the same with a start or pin, which, passing through a part of the harness, $a$, prevents the hook B from slipping on the same. This form of the rein-hook, shown at fig. 6, is used upon two parts of a harness or strap, the pin upon the upper side of the centre-bar $a$ passing through only one, or the under part of said strap, as shown, so that one part of said strap may be moved upon the other without moving the hook $a$, as shown in the drawing.

The third form of rein-hook is shown at fig. 9. It is similar in construction to the second form above described, except that the same is curved upon the under side to conform to the shape of the back of the horse or other animal, and is provided on the under side, at each end, with shoulders $s$, to prevent the same from working on the strap or harness, and is provided also with a loop or eye at one end, to receive another strap to hold the same back in position. This form is also cast in one piece, the same being secured to the strap, and prevented from sliding thereon by the pin $a^3$, as shown in the drawing. The form of rein-hook shown at fig. 6, and the form of the same shown at fig. 9 in the drawing, are placed upon the harness in the same way as the form shown at fig. 3, except that the frame or burr-plate and the cross-bar, being cast into one piece with the hook, or for convenience may be cast separate, and joined together by a screw-thread cut on lower end of hook, which is equivalent in utility to being cast together. The strap or part of the harness A is placed under one part of the frame B', over the cross-bar $a$, and under the other part of the frame B', as shown, the pin $a^3$ on said cross-bar $a$ fitting into a hole in said harness to receive the same, so as to prevent the hook from slipping instead of the screw $a^1$, fig. 3.

The terrets are shown in section in the drawing at fig. 4, a plan of the same being shown at fig. 1 and fig. 7. The terret D is of the general form of terrets now commonly in use, provided on the under side of the same with a screw-thread, by means of which the same is secured to the plate $d'$. The plate $d'$ is square in form, composed of four bars, with a centre bar, $a$, extending from one bar to the bar opposite, and between the sides $a^2$, fig. 4, said centre-bar $a$ being provided on the inside of the same with a screw-thread to receive the terret D. The terret-frame $d'$ is placed upon a portion of the harness fitted to the same in like manner with the rein-hook plates above described, a hole being made in that part of the harness corresponding to the hole in the cross-bar $a$, to receive the screw on the terret D. When the terret-plate $d'$ is placed in the required position on the harness A, or any part thereof, the terret D is screwed in through the said part of the harness A, so as to hold the said terret D firmly in position, at the same time preventing the said terret from slipping on the harness.

Constructed as above described, they constitute cheap and neat harness-trimmings or harness-mountings, the advantages of which are, that they may be easily removed or adjusted, and that the rein is not liable to slip from the rein-hook; and the same presenting no uneven surfaces upon the under side, they do not chafe the animal, and that the same are more cheaply and securely attached to any harness.

All of the harness-trimmings above shown and described are made of malleable or annealed iron, or of other suitable metal.

I claim as new, and desire to secure by Letters Patent—

1. The rein-hook B, fig. 3, in combination with the centre-bar, burr-plate B', and screw $a^1$, or its equivalent, substantially as shown and described, and for the purposes set forth.

2. The loop, centre-bar, burr-plate B', in combination with the centre-bar $a$, substantially as shown and described, and for the purposes set forth.

3. The rein-hook B, fig. 6, in combination with the projection $c$ and centre-bar $a$, substantially as shown and described, and for the purposes set forth.

4. The rein-hook B, fig. 9, in combination with the loop $e$ and cross-bar $a$ and shoulder $s$, substantially as shown and described, and for the purposes set forth.

5. The centre-bar burr-plate $d'$, fig. 1, in combination with the terret D, substantially as shown and described, and for the purposes set forth.

THOS. J. MAGRUDER.

Witnesses:
 JAS. S. ELLIOTT,
 JNO. E. DAVIDS,
 JOHN KISHLER.